Figure 1:
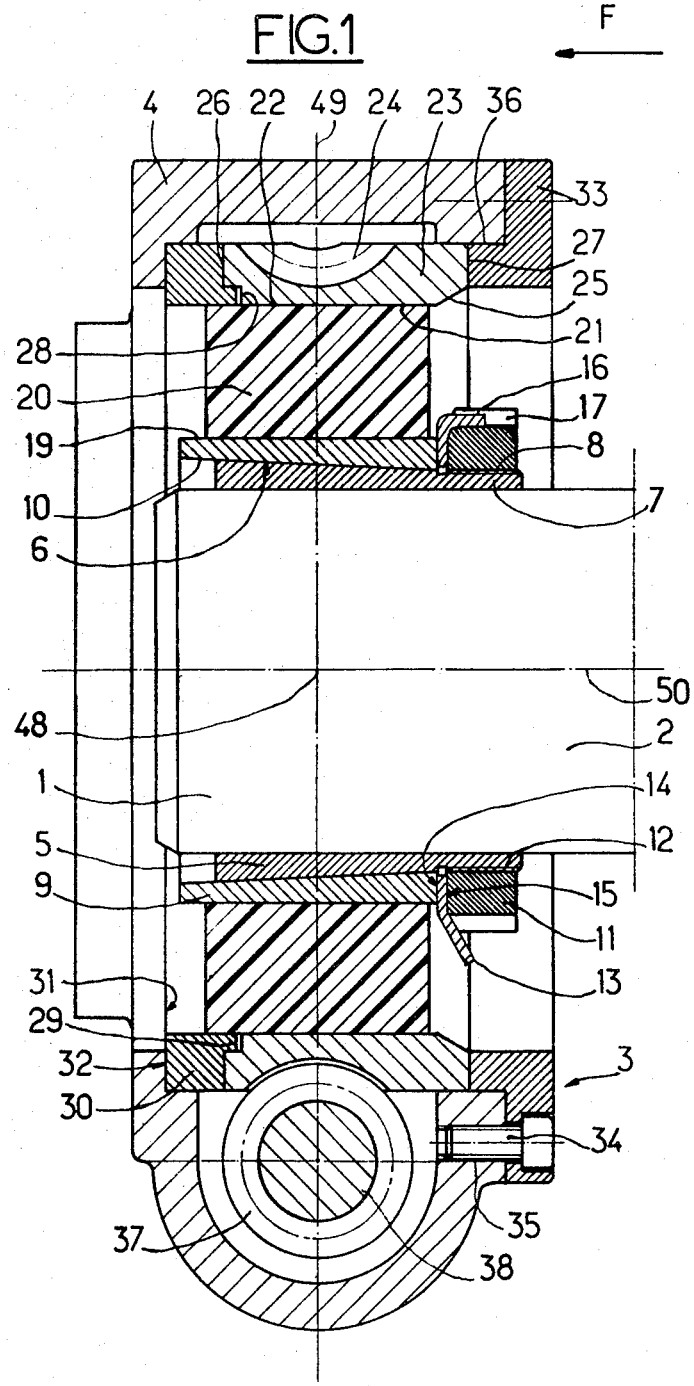

United States Patent
Hanssen

[11] 3,752,004
[45] Aug. 14, 1973

[54] BEARINGS
[75] Inventor: Pierre Joseph Hanssen, Schweighouse s/Moder, France
[73] Assignee: Hanssen & Cie S. A., Schweighouse s/Moder, France
[22] Filed: Dec. 10, 1971
[21] Appl. No.: 206,714

[30] Foreign Application Priority Data
May 7, 1971  France .............................. 7117690

[52] U.S. Cl. ................................................ 74/443
[51] Int. Cl. ........................................... F16h 55/14
[58] Field of Search ................ 74/443, 427; 308/70

[56] References Cited
UNITED STATES PATENTS
| | | | |
|---|---|---|---|
| 1,808,126 | 6/1931 | Albrecht | 308/70 |
| 3,076,352 | 2/1963 | Larsh | 308/70 |
| 3,115,796 | 12/1963 | Bullard et al. | 308/70 |

Primary Examiner—Charles J. Myhre
Assistant Examiner—Frank Susko
Attorney—Robert E. Burns et al.

[57] ABSTRACT

An end bearing for the shaft of a printing or other roller about which web or strip material is passed in a machine. The bearing has a first or inner sleeve which is fitted on the shaft and has a tapered outer face axially sliding in a second sleeve with a tapered inner face for joint assembly. Attached around the second sleeve is an anti-vibration transmission cylinder or sleeve of rubber material mounted in an annulus disposed in a static part of the bearing secured to the machine, which annulus is rotatable by gearing to vary the angular position of a shaft received in the inner sleeve which varies the angle of a roller mounted thereon.

4 Claims, 2 Drawing Figures

BEARINGS

The invention relates to improvements in bearings disposed at the ends of rollers, in particular unwinding rollers for unwinding films or materials in fibrous, cellulose, metallic and plastics strips, and in general all material in strip or web form.

Rollers, which may have variable operating functions, are used for unwinding, printing and rolling fibrous films, such as paper films. The operating speed of the whole machine causes the rollers to be subjected to very fast rotary movement. Because of this, the rollers are subjected to vibratory movements of substantial amplitude. These vibrations are felt both in a vertical plane and substantially in a horizontal plane. The vibrations are transmitted to the whole structure *via* the end bearings, which causes premature wear and tear of the different mechanical parts of the machine. To prevent the transmission of vibration from the machine to the ground, elastic covers or pads are inserted between the machine and the ground to absorb the vibrations. On the other hand, very bad vibrations are entirely reverberated in the machine, which necessitates the use of means to prevent transmission of the vibrations coming from the rollers to the body of the machine.

An object of the present invention is to provide an end bearing which absorbs or substantially absorbs vibrations and because of this prevents or substantially prevents the transmission of vibration to the machine, and which bearing may be manufactured at an attractive cost price.

There is provided according to the invention an end bearing, in particular for printing rollers, paper machine rollers or transformation rollers, wherein the bearing is disposed between members integral with an end of a shaft of a roller and members connected to the structure of a machine, said bearing comprising elastic means for absorbing vibrations, in particular, horizontal jolts, conferred on the roller by film or web material passed at high speed under or around the roller.

Figure 2:
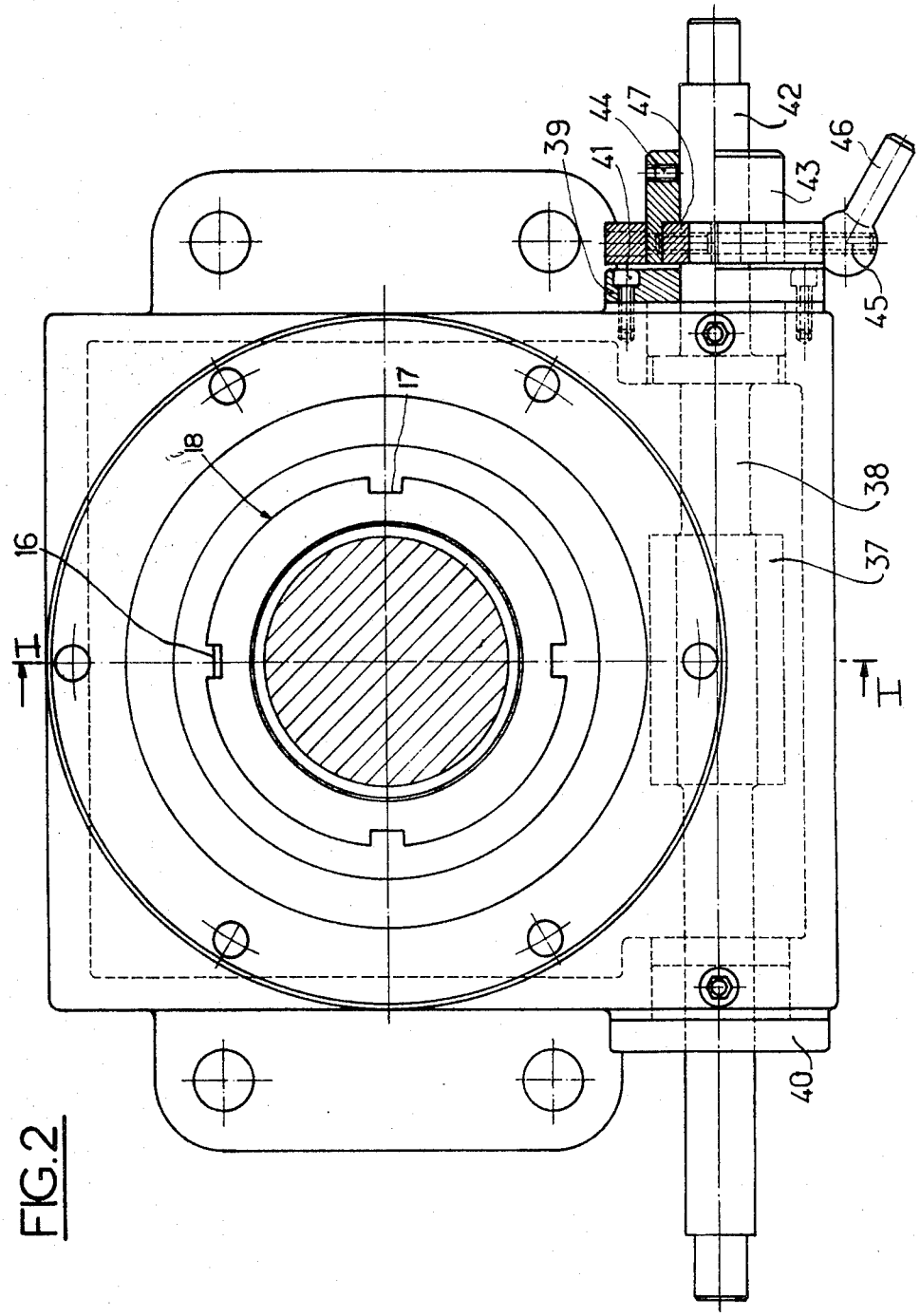

The invention will now be further described with reference to the accompanying drawing in which:

FIG. 1 is a vertical and axial sectional view of an end bearing formed according to the invention, on the line I—I of FIG. 2, and FIG. 2 is an elevational end view of the bearing from the direction of arrow F in FIG. 1.

Referring to FIG. 1, an end 1 of a fixed shaft 2 of a roller (not shown) is engaged in a bearing 3 holding the roller in a position determined with respect to the machine. This shaft 2, only one end journal of which is shown in the drawing, is concave in the centre part of the machine and carries a roller of the same shape driving the film, web or strip material, such as paper, at different angles depending on the angular position of the shaft 2.

The bearing 3 comprises a casing body 4 acting as a housing for all the necessary parts, on the one hand to keep the roller in a determined position and on the other hand to regulate the roller with respect to the unwinding direction and/or the inclination conferred on the roller which can be a curvilinear unwinding roller in order to modify the driving plane between the said roller and the paper film or web.

The necessary parts for keeping the end 1 of the shaft 2 of the roller in position are a sleeve 5 mounted on the end 1. This sleeve 5 has an outer tapered face 6, and a cylindrical end 7 provided with a screw thread 8. The tapered shape of the sleeve 5 is formed in such a manner that its smaller end faces towards the middle of the shaft.

A retaining sleeve 9 on the tapered sleeve 5 has a central bore 10 which is also tapered. A maiden nut 11 with a threaded aperture 12 pushes the sleeve 9 against the tapered part 6, with the result that these two sleeves are firmly wedged together. A nut-lock or locking washer 13, disposed between an end 14 of the sleeve 9 and an end 15 of the nut 11 prevents the latter from being unscrewed, by reason of curved tabs 16 located in grooves 17 formed in the periphery 18 of the nut 11.

A cylindrical ring or sleeve 20 of an elastic, rubber material, such as rubber, neoprene rubber, perbunan or other similar material is attached to an outer periphery 19 of the retaining sleeve 9. This ring 20 forms a vibration absorbing unit, and vibrations passed to the end 1 of the shaft 2 due to the unwinding of the web or film are absorbed by the ring 20. An outer periphery 21 of ring 20 is wedged against the inner surface 22 of an annulus 23 which has warm teeth 24 on its outer periphery. The resilient ring is expanded radially outwardly when the coaxial tapered sleeves are fully assembled coaxially.

The centre orifice 22 is widened at one end 27 by a bevelled or outwardly divergent enlargement 25 facilitating the positioning of the ring 20 as well as its centering. An end 26 of annulus 23, opposite to the end 27, is formed with an annular recess 28 in which there is placed a circular boss 29 on a side face of an annulus 30. The opposite side face 31 of annulus 30 abuts against a shoulder 32 formed internally of the casing body 4.

The whole is held in position laterally by a cover 33 maintained in place by screws 34, the ends of which are inserted in threaded orifices 35 formed laterally in the body 4. In order to centre the cover 33, the latter comprises a cylindrical shoulder 36 sliding in the central orifice of the body 4.

The teeth 24 enmesh with teeth 37 on a worm shaft 38. The latter is disposed at the lower part of the body 4 and occupies a position perpendicular to the shaft 2. The worm shaft 38 passes through the casing body 4. Covers 39 and 40 laterally seal the passage made in the body 4 and are fixed to the body by fixing screws 41. One end 42 of the worm shaft 38 mounts a locking ring 43 fixed to the shaft by grub screws 44. By the intermediary of a pin 45, actuated by a lever 46 and engaging in a ring formed in two parts 47, the shaft 38 can be locked against rotation (FIG. 2).

By this arrangement, the angular position of the shaft 2 can be varied by applying a rotary movement to it with respect to an intersection point 48 of the vertical or diametrical axis 49 of the bearing 3 and the horizontal axis 50 of the roller shaft 2. Thus, the driving angle between the roller and the paper film may be varied.

Although the invention has been described with regard to a particular embodiment, it will be understood that the invention is not limited to this embodiment and that various modifications in shape and material may be made without departing from the scope of the invention.

What is claimed is:

1. An adjusting bearing comprising, a vibration-absorbing sleeve made of a resilient material, an annulus circumferentially around said vibration-absorbing sleeve having a peripheral worm thread, a pair of coaxial sleeves internally of said vibration-absorbing sleeve having coacting tapered surfaces for wedging the two coaxial sleeves in an assembled state to expand the vibration sleeves radially outwardly to form a unitary rotatable structure therewith for rotating angularly a shaft received in use in an inner one of said coaxial sleeves, a housing on said sleeve, a worm screw supported by said housing and meshing with said worm threads for rotatably driving said shaft, said coaxial sleeves, said vibration-absorbing sleeve, and said annulus as a unit.

2. An adjusting bearing according to claim 1, including means releasably locking said worm screw in angular positions thereby to maintain the shaft received in the inner coaxial sleeve in adjusted angular positions.

3. An adjusting bearing according to claim 2, including retaining means locking the coaxial sleeves having tapered coacting surfaces in an assembled state to maintain said vibration-absorbing sleeve radially expanded for joining the coaxial sleeves and annulus for joint rotation therewith.

4. An adjusting bearing according to claim 3, in which said coaxial sleeves comprise said tapered surfaces for coaxial assembly thereof to progressively expand said vibration-absorbing sleeve upon assembly thereof and said retaining means comprises means locking said coaxial sleeves upon complete coaxial assembly thereof.

* * * * *